US006782207B1

(12) United States Patent
Efimov (10) Patent No.: US 6,782,207 B1
(45) Date of Patent: Aug. 24, 2004

(54) NARROW BAND TRANSMITTING-RECEIVING TELESCOPE SYSTEM

(75) Inventor: Oleg Efimov, Orlando, FL (US)

(73) Assignee: Research Foundation of the University of Central Florida, Incorpoated, Orlando, FL (US)

(*) Notice: Subject to any disclaimer, the term of this patent is extended or adjusted under 35 U.S.C. 154(b) by 596 days.

(21) Appl. No.: 09/844,141

(22) Filed: Apr. 27, 2001

(51) Int. Cl.7 ............................................. H04B 10/00
(52) U.S. Cl. ....................... 398/128; 398/118; 398/114; 398/130
(58) Field of Search ........................... 398/87, 96, 103, 398/114, 118, 127–128, 130; 359/233–236, 415; 385/37; 250/206.1, 347, 559.14

(56) References Cited

U.S. PATENT DOCUMENTS 3,771,129 A * 11/1973 McMahon ................. 382/127
4,796,183 A * 1/1989 Ermert et al. ............... 378/10
4,875,756 A * 10/1989 Estes et al. ................ 398/114

FOREIGN PATENT DOCUMENTS

JP 2001317926 A * 11/2001
SU 1158961 A * 5/1985

* cited by examiner

Primary Examiner—Kinfe-Michael Negash
(74) Attorney, Agent, or Firm—Brian S. Steinberger; Law Offices of Brian S. Steinberger, P.A.

(57) ABSTRACT

This disclosure relates to a laser communication system which allows changing the direction of reception and transmission without external manipulation of the system container. The basic unit of the system is a narrow-band transmitting-receiving telescope apparatus which includes a rotating diffraction grating and an independently rotating stage with mounted combination of photodetector for reception and laser for transmission and a focusing system concentrating the beam reflected from the grating onto the photodetector of the combination or sending a beam from laser of the combination onto the grating. The selection of definite angles for signal transmission-reception is realized by corresponding rotation of grating and rotating stage to the proper angles. The apparatus is intended for spectrally selective transmitting or receiving of optical radiation. The main advantages of this apparatus are compactness and its ability to receive and/or transmit the light with definite wavelength from/to an arbitrary direction without changing of the physical articulation of apparatus as whole.

11 Claims, 7 Drawing Sheets

Transmitting apparatus

Receiving apparatus

Transmitting apparatus    Receiving apparatus

FIG. 10b $$|\vec{k}| = |\vec{k}_1| = |\vec{k}_2| = \frac{2\pi}{\Lambda};$$

$$|\vec{p}| = |\vec{q}| = \frac{2\pi}{\lambda};$$

NARROW BAND TRANSMITTING-RECEIVING TELESCOPE SYSTEM

This invention relates to optical communication and in particular to an apparatus and method for transmitting and receiving intelligence by means of optical energy.

BACKGROUND AND PRIOR ART

With the advent of the laser, many devices were soon developed for both transmitting and coding information-bearing intelligence upon the infrared, visible, and ultraviolet optical beam produced by the laser. It was quickly recognized that specific properties of its emitted optical radiation enabled its beam to carry high-density information. That is, analog or digital information which conveyed intelligence could be transmitted, received, and/or coded by means of the proper shaping and/or modulating of the laser beam.

The development of improved gas, solid state, and semiconductor lasers for feeding optical-fiber systems for transmission of information has also lead to the development of free-space or atmospheric optical systems such as is disclosed in U.S. Pat. No. 4,627,106. It is taught therein that a beam of spatially coherent, monochromatic, aperture limited, electromagnetic optical energy can be modulated with intelligence-bearing information to develop wavefronts of mutually-aligned orientation, thereafter propagated through free space and subsequently detected by a receiving means for deriving and utilizing the information provided by the demodulation.

Thus, optical free-space communication channels have been established using laser sources in both the visible and infrared spectral regions. Their high directionality is one of most appealing characteristics of laser beams and this property is often used in optical free-space communication (see U.S. Pat. Nos.: 4,764,982; 4,928,317; and, 5,457,561).

High-density communication systems are perhaps the most rapidly developing economic sector. Advances in fiber optic communication systems have brought tremendous market opportunities. One potential bottleneck in the wide spread of fiber optic systems is the "last mile" connection to consumers as well as specific requirements of "local area networks". For obvious economic reasons, the first choice in these situations in communication systems is the broadband wireless systems. The available options are radio, microwave, and free-space optical connections. Optical free-space communication systems have definite advantages such as dense wavelength division multiplexing; no special operation licensing (unlike microwaves); ease of installation and fast deployment; and, highly secure (direct link). In principle, full benefits of fiber optic communications (speed, volume, etc) can be obtained in free-space connections.

In summary, there are requisites of novel methods of angular control and/or directional sending and receiving of radiation of one or more laser beams having the same or different wavelengths which can be used for the operation of LIDAR, LADAR, different kind of scanning systems, WDM devices for systems of fiberless optical networks.

One of the very important needs of the last noted systems is a compact, planar and easily adjustable customer unit to send and receive data through the air. This was so indicated by a Lucent Technologies Press Release entitled "Terrabeam Corporation and Lucent Technologies to jointly develop and deploy Terrabeam's breakthrough fiberless optical technology" of Apr. 12, 2000 (see http://lucent.com/press/0400/000412.coa.html) where it was stated that this unit was "at the heart of TeraBeam's solution" ". . . to develop and deploy . . . fiberless optical networking system that provides high-speed data networking between local and wide area networks".

SUMMARY OF THE INVENTION

The first objective of the present invention is to improve non-confined free-space optical communications.

The second object of this invention is to provide an optical communication system consisting of transmitter and/or receiver which have spectral selectivity from one side.

The third object of this invention is to provide an optical communication system featuring a receiver and/or transmitter which is compact, planar and is easily adjustable from one side.

The fourth objective is to provide an optical communication system featuring a receiver and/or transmitter which has spectral selectivity from one side and is compact, planar and easily adjustable from the other side.

The fifth objective is to provide transmitting-receiving unit for optical communication with a design that allows a unit readjusting for any direction of transmission or reception without changing of its original plane position.

A preferred embodiment fully describing the invention representing a narrow-band transmitting-receiving telescope apparatus for optical communication is an apparatus comprising: a rotating diffraction grating; and an independently rotating stage with the mounted combination of a laser directing beam onto said grating for transmission, a photodetector, and a focusing system which concentrates the received optical beam reflected from the said grating onto said photodetector for reception whereby the selection of definite angles for signal transmission-reception is realized by a separate rotation of said grating and said rotating stage to the proper angles.

Further objects and advantages of this invention will be apparent from the following detailed description of a presently preferred embodiment, which is illustrated schematically in the accompanying drawings.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

It is would be useful to discuss the meanings of some words used herein and their applications before discussing a preferred embodiment and the several Figures including:

Narrow band transmitting-receiving telescope apparatus is apparatus which can be used for transmission and reception of narrow band optical radiation to or from predetermined direction through the air and acts as an optical telescope system simultaneously to improve a divergence of transmitted laser beam or to concentrate a received radiation to the photodetector. In some instances, the transmittance of radiation can be performed directly without expanding of optical beam.

Rotating diffraction grating is a diffraction grating which has a capability to rotate in its own plane, i.e. around axis perpendicular to the plane of grating. As shown herein, the axis crosses usually the central region of grating.

Independently rotating stage with mounted means is a stage which can rotate around diffraction grating and in the plane of grating but regardless of its rotation. As shown herein, both grating and stage are usually rotated around the same axis.

Definite wavelength is a specific laser wavelength used for communication between transmitting and receiving apparatuses.

Definite angles are the predetermined azimuth angle and angle of elevation which are determined totally a direction of beam in free space.

Planar implies the thickness, i.e. small depth, of apparatus.

Figure 1:
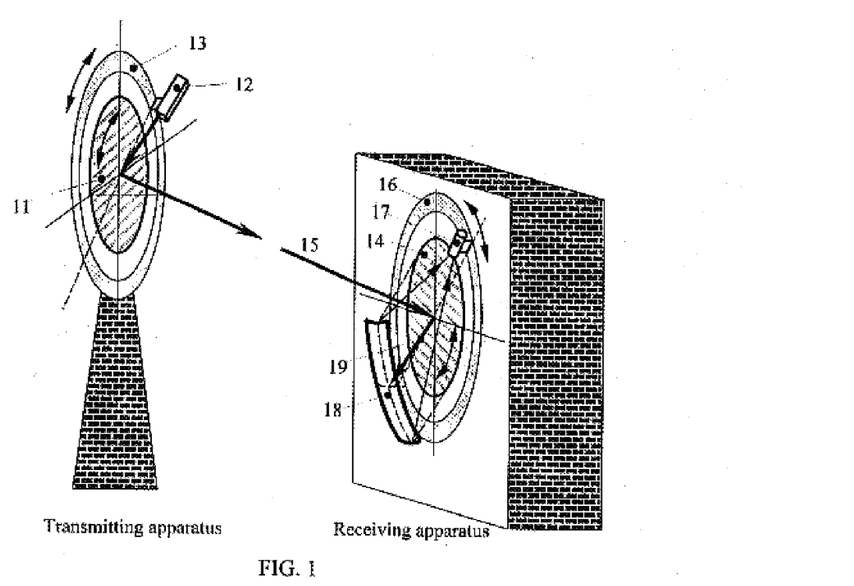
FIG. 1 is a schematic setup of narrow band transmitting-receiving telescope apparatus.

FIG. 1 schematically shows the essential elements of the telescope system of the invention, i.e. a narrow-band transmitting apparatus which includes a rotating diffraction grating 11 reflecting beam 15 of definite wavelength from laser 12 under definite angles, an independently rotating stage 13 onto which is mounted laser 12, and a receiving apparatus which includes a rotating diffraction grating 14 reflecting incident beam 15 from said transmitting apparatus under definite angles, an independently rotating stage 16 with diametrically opposite mounted photodetector 17 and mirror 18 concentrating reflected beam 19 onto the photodetector 17. Any other concentrating system can be used instead of mirror 18. Sometimes it is useful to use the telescope system in the transmitting apparatus as it is in receiving apparatus to reduce the laser beam divergence. To use the same apparatus for both the transmitting and receiving apparatus, the laser 12 should be positioned with (added to) the photodetector 17 and additional optics provided to coincide the direction of input and output beam 15. Fiber elements and connectors can be used to simplify said apparatus. The apparatus is intended for spectrally selective transmitting or receiving of laser radiation. To make the apparatus as thin as possible the concentrating mirror 18 and the laser 12 and/or photodetector 17 should be placed near the diffraction grating plane.

The appropriate diffraction gratings according to this invention are gratings with period of $\Lambda$ which is chosen from condition that a normally incident beam with wavelength $\lambda$ has to be diffracted under large angle $\theta_d = \arcsin(\lambda/\Lambda)$ to a normal to the plane of grating. In this case the mirror 18 can be made rather narrow to provide small thickness of apparatus. It will be shown later that in this case for any incident angle $0° < \theta_i \leq 90°$ it is possible to find such position of grating 14 by its rotation that the angle of diffraction beam 19 is equaled to the mentioned angle $\theta_d$. The alignment of apparatus for arbitrary angle of incident beam with wavelength $\lambda$ is realized in two steps. Firstly, the angle $\theta_d$ of diffracted beam 19 is provided by rotation of diffraction grating 14 in its own plane. It should be noted that in general case the planes of incident beam and diffracted beam would be different. Then, by rotation of stage with mounted mirror 18 and photodetector 17, the direction of diffracted beam 19 is aligned with mirror 18 which focused the beam to the photodetector 17.

Figure 2A:
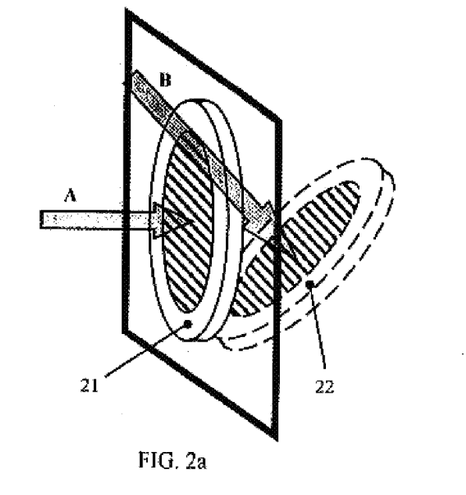
FIG. 2a illustrates the reception of a signal after its direction change provided by apparatus of the prior art.
Figure 2B:
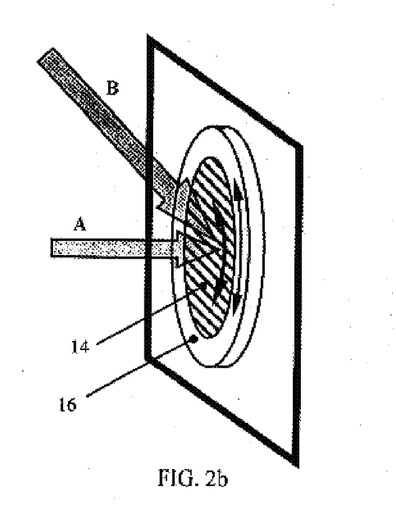
FIG. 2b illustrates the reception of a signal after its direction change provided by the apparatus of the invention.

The main advantages of this inventive system are an opportunity to make it rather planar and to receive (transmit) the light with definite wavelength from (to) arbitrary direction without changing of apparatus position as a whole. These features are demonstrated in FIG. 2 which shows the difference between an adjusting of a customer unit 21 with its fixed parts as shown by (FIG. 2a) and a modified customer unit provided according to this invention consisting of an independently rotating grating 14 and stage 16 as shown by FIG. 2b. Imagine that the customer unit (both the fixed type and the inventive type) is positioned on a window and is adjusted to receive the optical signal from direction A. Assume now that the direction of the signal is changed as shown by B. For the fixed system, it will be necessary to readjust the unit as a whole in the first case (see FIG. 2a). It means that the unit has to be moved from the plane of window to obtain the signal from direction B. Therefore, in spite of a planar design, this unit will protrude from the plane of window into the room more or less depending on direction of received signal as shown by 22 of FIG. 2a. In the case of novel unit of the invention as illustrated by FIG. 2b, the readjustment to receive the signal from direction B will be realized by independent rotation of diffraction grating 14 and stage 16 as described before in that of FIG. 1 to provide the proper angles to the plane of grating 14, i.e. without changing of unit position as a whole.

Figure 3:
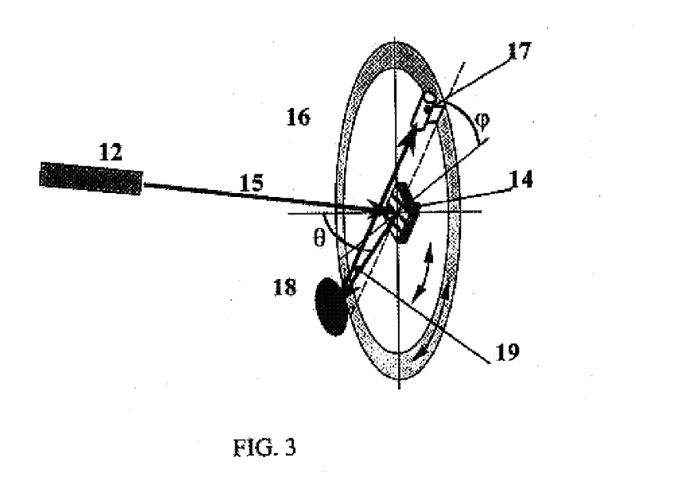
FIG. 3 shows a schematic of a communication system incorporating the invention.

Refer now to FIG. 3 (with the same numerical designations as FIGS. 1 and 2) which shows in detail the system involved wherein the invention is utilized as part of the narrow-band transmitting-receiving telescope system which overcomes the limitations and difficulties of known systems for the reception and transmission of data through the free-space air. A He—Ne laser (12) bought from "Melles Griot" provided a beam 15 at a wavelength of 633 nm . The beam 15 was send to rotation diffraction grating 14 with size of 12.7 mm×12.7 mm and 1200 grooves per mm which was bought from "Edmund Industrial Optics". As the first step, the rotation of grating 14 to a proper angle was fulfilled to provide an equality of the elevation angle $\theta$ of diffracted beam 19 to the angle between a normal to the grating 14 and a direction to the mirror 18 from the center of grating 14. Then the system was adjusted finally by using a rotation of stage 16 with mounted focusing mirror 18 bought from "Casix, Inc." and photodetector 17 of powermeter from "Ophir Optronics Ltd.", on the angle providing the beam 19 sending to the mirror 18 and then to the photodetector 17. It will be shown later that the rotation angles of grating 14 and stage 16 to provide right angles $\theta$ and $\varphi$ can be calculated exactly in advance if the angular coordinate of incident laser beam are known.

The example uses a He—Ne laser. Still other lasers can be used such as but not limited to diode pumped lasers, gas lasers, solid state lasers, waveguide lasers, semiconductor lasers, and the like since each needs only to pump out an optical beam suitable for free space transmission of intelligence.

As it must now be apparent that the basic idea behind this invention consists in the using of plane diffractive gratings in an unusual way when the grating vectors do not lie in the plane of beam incidence. This way allows varying the direction of diffracted beams just by grating rotation in its own plane and by radiation source rotation around the grating. It opens a prospect for a number of new applications of grating discussed below.

Figure 4:
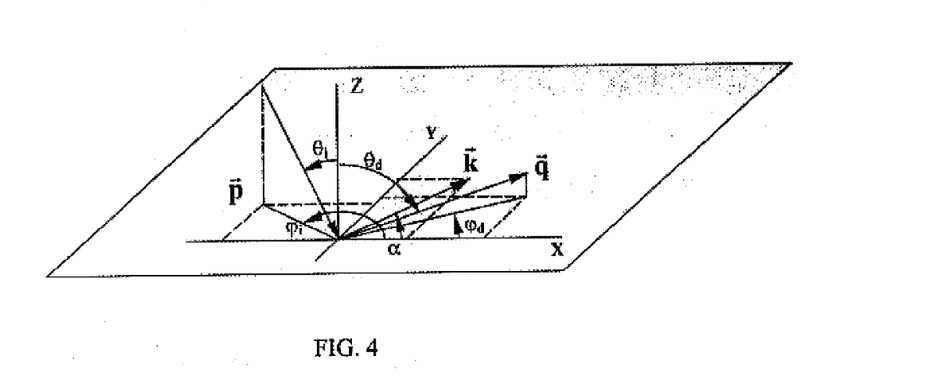
FIG. 4 provides a scheme for calculation of the diffracted beam direction.

The basic requirement to a customer receiver unit is a high spectral selectivity from one side and real compactness, planar shape, and simplicity of adjustment from the other side. To determine the solution of this problem let's consider diffraction of plane light wave $\vec{p}$ with wavelength $\lambda$ incident under angles $\theta_i$ and $\phi_i$ upon plane diffractive grating $\vec{k}$ with period $\Lambda$ placing in the XY-plane (see FIG. 4). Let's calculate the angle of grating rotation $\alpha$, and the angles of elevation $\theta_d$ and of azimuth $\phi_d$ of diffracted beam $\vec{q}$. Reference should now be made to the following equations (1) through (7).

Figure 5:
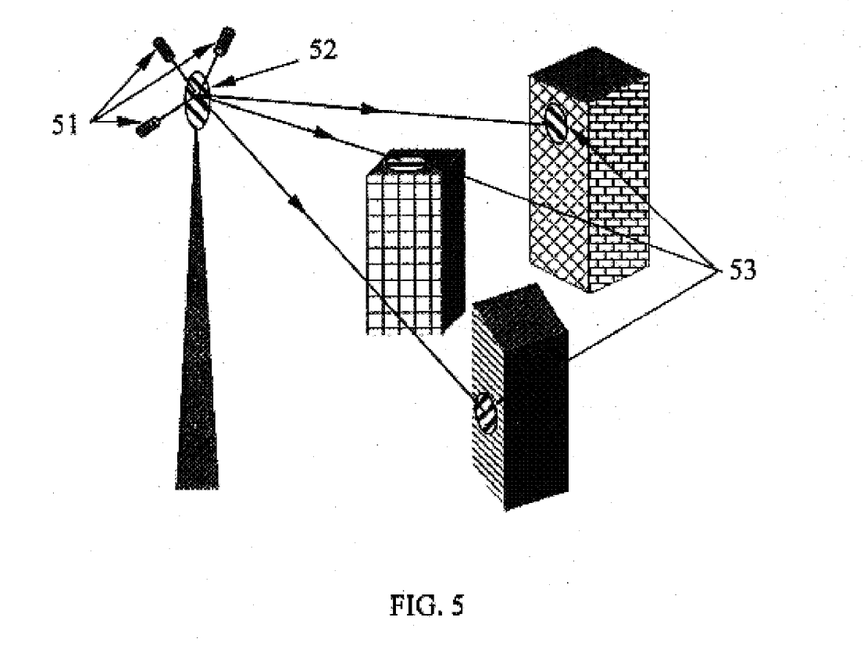
FIG. 5 shows a method of using one grating for connection with different customers.

Reference should now be made to FIG. 5. The correct disposition of lasers 51 around the grating 52 used as a transmitter will allow sending the signals with the same or different wavelengths to different directions simultaneously. It is important that these directions do not have to lie in the same plane in according with equation (6) and (7). So, it is possible to use just one grating to maintain communication with a number of customers 53 placed in the different direction of space. Thus, this invented system overcomes the current requirement of high-power (multiwatts) lasers to send the signals to a wide solid angle to maintain communication with a number of separate customers within a distance of ~1 mile. A laser beam with a power of ~0.1 W will be more then enough for reliable communication with similar customers when used in this inventive system. Moreover, the separate service of each customer at the same time will increase the rate of communication and exclude an interference of different channels. Of course, it is possible to use a number of photodetectors placed around a grating to receive the signals from different directions simultaneously, as it was describe above for lasers in transmitting apparatus.

Figure 6:
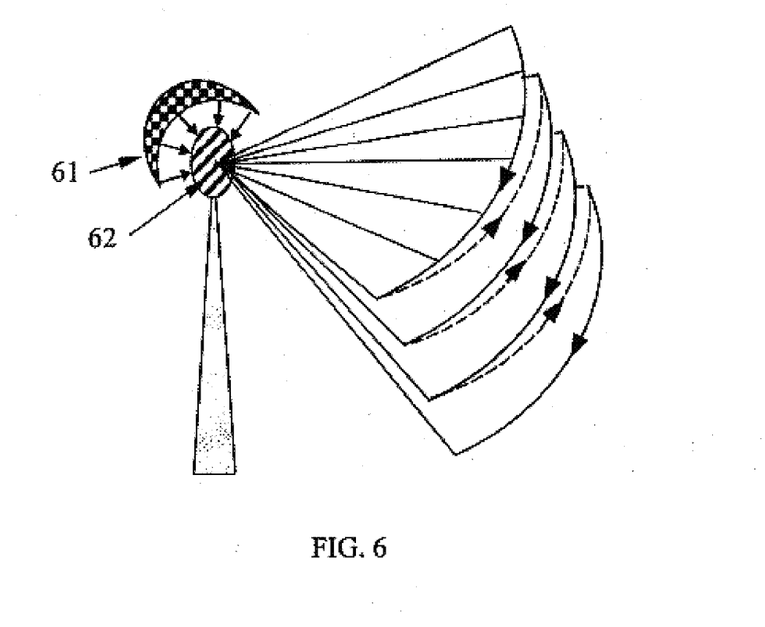
FIG. 6 shows a method of using a laser diodes matrix for space scanning.

Referring now to FIG. 6, another alternative application involves using a matrix 61 of lasers, laser diodes, emitting fibers or the like for irradiation of grating 62 as is shown therein. Proper design and disposition of such a matrix 61 with regard to grating 62 will allow the space scanning according to any beforehand given law in rather wide solid $$\vec{k} = \vec{e}_x k_x + \vec{e}_y k_y;$$
$$\vec{p} = \vec{e}_x p_x + \vec{e}_y p_y - \vec{e}_z \sqrt{p^2 - p_x^2 - p_y^2};$$
$$\vec{q} = \vec{e}_x (p_x \pm mk_x) \pm \vec{e}_y (p_y \pm mk_y) + \vec{e}_z \sqrt{q^2 - (p_x \pm mk_x)^2 - (p_y \pm mk_y)^2};$$
$$|\vec{k}| = \frac{2\pi}{\Lambda}; |\vec{p}| = |\vec{q}| = \frac{2\pi}{\lambda};$$
(1)

$$\cos\theta_d^m = \frac{q_z}{|\vec{q}|};$$
(2)

$$\cos^2\theta_d^m = \left(\frac{\lambda}{2\pi}\right)^2 \left\{ \left(\frac{2\pi}{\lambda}\right)^2 - \left[\left(\frac{2\pi}{\lambda}\right)^2 \sin^2\theta_i \cos^2\varphi_i \pm 2\frac{m(2\pi)^2}{\lambda\Lambda} \sin\theta_i \cos\varphi_i \cos\alpha + + m^2\left(\frac{2\pi}{\Lambda}\right)^2 \cos^2\alpha + \left(\frac{2\pi}{\lambda}\right)^2 \sin^2\theta_i \sin^2\varphi_i \pm 2\frac{m(2\pi)^2}{\lambda\Lambda} \sin\theta_i \sin\varphi_i \sin\alpha + m^2\left(\frac{2\pi}{\Lambda}\right)^2 \sin^2\alpha \right] \right\}$$
(3)

$$\cos^2\theta_d^m = 1 - \sin^2\theta_i \mp 2\left(m\frac{\lambda}{\Lambda}\right) \sin\theta_i \cos(\varphi_i - \alpha) - \left(m\frac{\lambda}{\Lambda}\right)^2$$
(4)

$$\sin\varphi_d = \frac{q_y}{|\vec{q}|\sin\theta_d^m} = \frac{\lambda}{2\pi} \frac{p_y \pm mk_y}{\sin\theta_d^m} = \frac{\lambda}{2\pi} \frac{\frac{2\pi}{\lambda}\sin\theta_i\sin\varphi_i \pm m\frac{2\pi}{\Lambda}\sin\alpha}{\sin\theta_d^m} \text{ or }$$
(5)

$$\sin^2\theta_d^m = \sin^2\theta_i \pm 2\left(m\frac{\lambda}{\Lambda}\right)\sin\theta_i\cos(\varphi_i - \alpha) + \left(m\frac{\lambda}{\Lambda}\right)^2$$
(6)

$$\sin\varphi_d = \frac{\sin\theta_i\sin\varphi_i \pm \left(m\frac{\lambda}{\Lambda}\right)\sin\alpha}{\sin\theta_d^m}$$
(7)

Equations (6) and (7) define the direction of diffracted beam ($\theta_d^m$ and $\phi_d$) completely in dependence on the period ($\Lambda$) and angle ($\alpha$) of grating, and the wavelength ($\lambda$) and direction ($\theta_i$ and $\phi_i$) of incident beam. They can be used to define any pair of angles $\alpha$, $\theta_d^m$ and $\phi_d$, if one of them is known. Besides, they indicate that for the same direction of incident beam only the beam with specific wavelength $\lambda$ will diffract in the direction defined by angular coordinates $\theta_d^m$ and $\phi_d$, i.e. such design is possessed of spectral selectivity. Just for simplicity let's consider hereinafter the first order of diffraction, i.e. m=1.

angle. This scanning will be secured by proper switching of lasers. The change of the order of lasers switching will lead to the desired changing of the scanning picture. Moreover, such design will allow scanning the several different areas simultaneously. The significant advantage of this design is the absence of movable parts.

Figure 7:
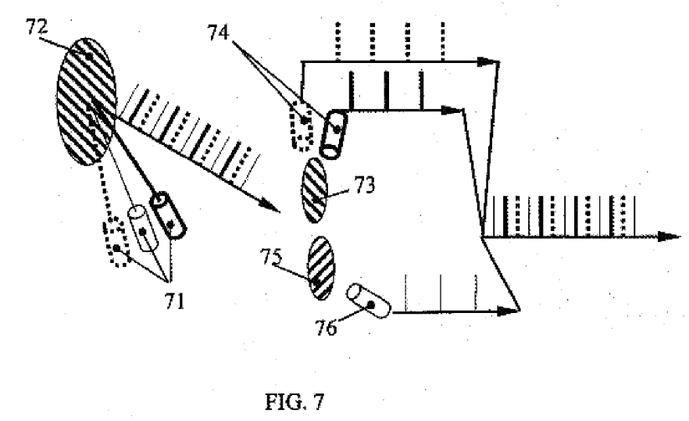
FIG. 7 illustrates an explanation of high-speed data networking.

Let's consider a diffraction of a number of slightly different wavelengths $\lambda_k$ incident under the same angle upon the grating. In this case the diffraction of all these wavelengths will be observed under a little different azimuth and elevation angles $\phi_{dk}$ and $\theta_{dk}$. It means that if transmitter-receivers are placed along proper line, it will be possible to send and receive signals of different wavelengths simultaneously, i.e. such design is wavelength division multiplexing (WDM) device of FIG. 7. This circumstance allows in particular an increasing the speed of data networking. If N light sources 71 as the three shown in FIG. 7, each having different wavelengths and the same pulse repetition frequency are used, it is possible to send their radiation in the same direction with pulse repetition frequency N-times more than each of them. To do this it is necessary to dispose them properly around grating 72 and synchronize their functioning as it is shown in FIG. 7. Reception of this high-frequency signal can be done with just one device which includes grating 73 and N photodetectors 74 properly disposed for directional reception of different wavelengths with different photodetectors 74, or with several devices which include gratings 73 and 75 and photodetectors 74 and 76 whereby multiplexing is realized. Synchronization of signals from all these devices can be performed easily by connection of them with cables having proper lengths. Of course, the same system can be used for service of a number of different customers.

If it is necessary to observe the diffracted beam under the same angle $\theta_d$ for any incident angle, i.e. $\sin\theta_d = C(\text{const})$ then the angle of grating rotation $\alpha$ in its own plane can be found from equation (6)

$$\cos(\varphi_i - \alpha) = \pm \frac{1}{2\left(\frac{\lambda}{\Lambda}\right)\sin\theta_i}\left[C^2 - \left(\frac{\lambda}{\Lambda}\right)^2 - \sin^2\theta_i\right] \quad (8)$$

and the azimuth angle of diffraction from (3)

$$\sin\varphi_d = \frac{1}{C}\left[\sin\theta_i\sin\varphi_i \pm \left(\frac{\lambda}{\Lambda}\right)\sin\alpha\right]. \quad (9)$$

Figure 8:
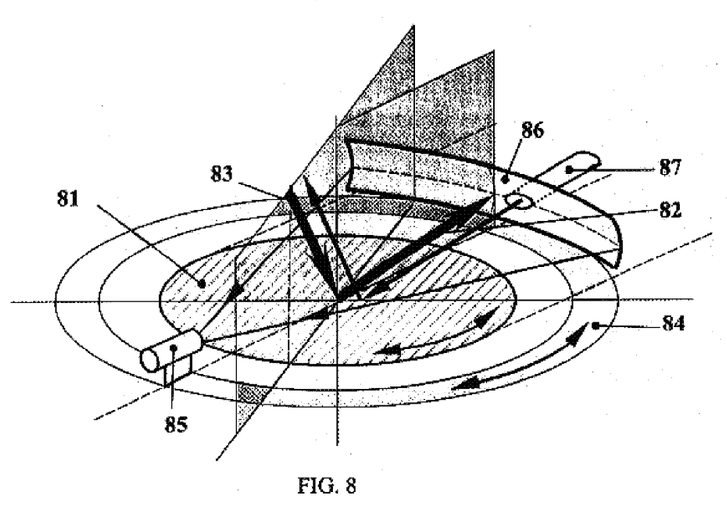
FIG. 8 provides a design of a plane customer unit for a fiberless optical network.

The equations (8) and (9) provide the ability to design a planar customer unit as pictured in FIG. 8. The unit consists of a separately rotatable grating 81 to adjust the elevation angle of diffracted beam 82 for any angle of incident beam 83, and an independently rotating stage 84 with diametrically opposite mounted combination 85 of photodetector for reception and laser for transmission and a focusing system 86 concentrating beam 82 reflected from grating 81 onto the photodetector of combination 85 or sending a beam from laser of combination 85 onto grating 81. Sometimes, it will be more effective to use separate laser 87 to send beam without expansion.

Let consider a specific example when a diffraction grating has such period $\Lambda$ that $$\sin\theta_d = \frac{\lambda}{\Lambda} = C(\text{const}). \quad (10)$$

In the design of a planar customer unit, the diffraction angle should be very closed to the sliding angle. For example, if we choose $\theta_d = 85°$ ($C \sim 0.996$), a frequency of grating for wavelength 1.55 μm will be equal to ~643 mm$^{-1}$. Let's orient the unit such way that the angle $\varphi_i = 0$. Then from equations (6) and (7) one obtains $$\left.\begin{array}{l}\cos\alpha = -\dfrac{\sin\theta_i}{2C} \\ \sin\theta_d = \sin\alpha\end{array}\right\} \quad (11)$$

Figure 9:
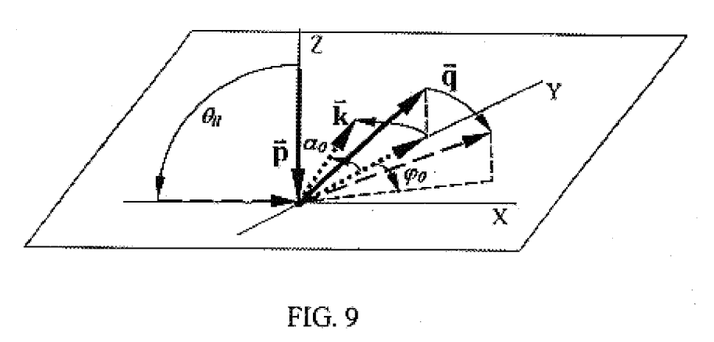
FIG. 9 illustrates the changes to rotation angles of the grating and diffraction beam vectors with change of angle of incident beam vector.

If one introduces new angles $\alpha_0 = \alpha - 90°$ and $\varphi_0 = 90° - \varphi$ as they are indicated in FIG. 9 then $$\left.\begin{array}{l}\sin\alpha_0 = -\dfrac{\sin\theta_i}{2C} \\ \cos\varphi_0 = \cos\alpha_0\end{array}\right\} \quad (12)$$

$$\left.\begin{array}{l}\alpha_0 = \arcsin\left(\dfrac{\sin\theta_i}{2C}\right) \\ \varphi_0 = \alpha_0\end{array}\right\} \quad (13)$$

As it follow from equation (13) when beam incident angle $\theta_i$ is changed from 0° to 90° it will be necessary to rotate the diffraction grating in its own plane on the angle $\alpha_0$ in a region from 0° to 90° to adjust the same diffraction angle $\theta_d$ as for normal incident angle (85° in considered example). At the same time the azimuth direction of diffracted beam $\varphi_0$ will be changed on the same value $\alpha_0$ in the opposite direction (see FIG. 9). For practical realization of the customer unit, it is important that the angles $\alpha$ and $\varphi_d$ will be changed on the same value refer to YZ-plane simultaneously.

It is possible to use this unit as a transmitting-receiving scanning system. Referring again to FIG. 8, if grating 81 and rotating stage 84 are rotated in opposite directions around the same axis with the same angular speed, the space will be scanned in the region ±90° in any chosen plane defined by starting angle of grating 81 with reference to the angle of rotating stage 84. For example, if the value of C from equation (10) is chosen to be equal to 0.5, i.e. $\theta_d = 30°$ then $\alpha_0 = \varphi_0 = \theta_i$. This means that the free space will be scanned continuously with the angular speed equaled to the angular speed of grating rotation when the laser is placed on rotating stage 84. Moreover, variation of angular speed and direction of relative rotation of grating and rotating stage will change the directional pattern of free space scanning.

Of course, for high-frequency application like the fiberless optical network the shape of grating and disposition of transmitter-receivers have to be optimized to minimize the propagation difference between different optical rays and to secure the maximal transmitted-received power.

Figure 10A:
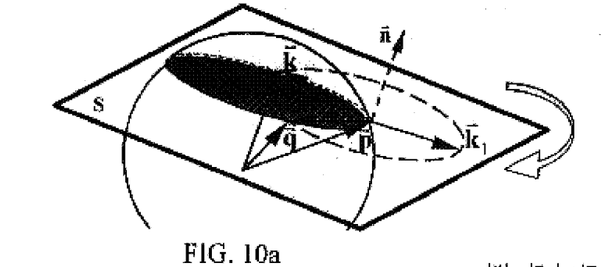
FIGS. 10a and 10b illustrate the explanation of Bragg grating alignment.

The next important opportunity is provided by using a Bragg grating. Referring now to FIG. 10a, a Bragg grating with vector $\vec{k}$ is placed in the plane of sample S with a reconstructing beam of vector $\vec{p}$ directed under big angle of incidence to the plane of sample S. If both incident ($\vec{p}$) and diffracted ($\vec{q}$) beam vectors originate from the same point, all possible extreme points of diffracted beam vector will be placed on the surface of sphere with radius $$\frac{2\pi}{\lambda}.$$

Then using only a rotation of sample in its own plane will make it possible to define one or two positions of grating vector ($\vec{k}_1$ and $\vec{k}_2$) when Bragg conditions are satisfied. Thus, it is possible to adjust Bragg grating for reaching maximal diffraction efficiency using just sample rotation in its own plane.

Figure 10B:
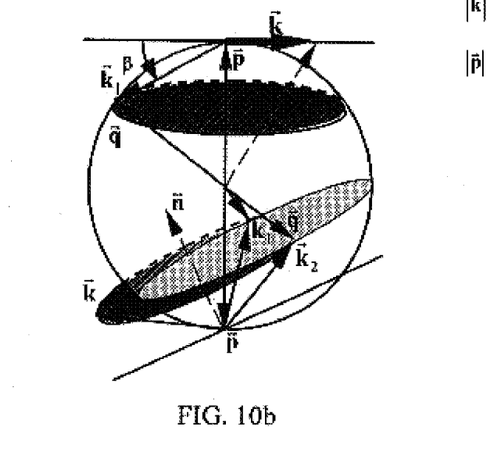

However, if Bragg grating vector is placed in the plane of sample, there will be some diapason of angles of incidence close to normal when it will be impossible to satisfy the Bragg condition only by sample rotation in its own plane. This example is shown for grating vector $\vec{k}$ and beam vector $\vec{p}$ in the top of FIG. 10b. To make possible an implementation of Bragg condition for any angle of incidence using such alignment, the grating vector $\vec{k}_1$ (the top of FIG. 10b) has to be placed under the angle $$\beta = \arcsin\left(\frac{|\vec{k}_1|}{2|\vec{p}|}\right) = \arcsin\left(\frac{\lambda}{2\Lambda}\right) \quad (14)$$

to the plane of the sample. In such a case the rotation of sample in its own plane can be used for alignment of diffraction grating to satisfy with Bragg condition for arbitrary angle of incidence of radiation at the bottom of FIG. 10b.

Figure 11:
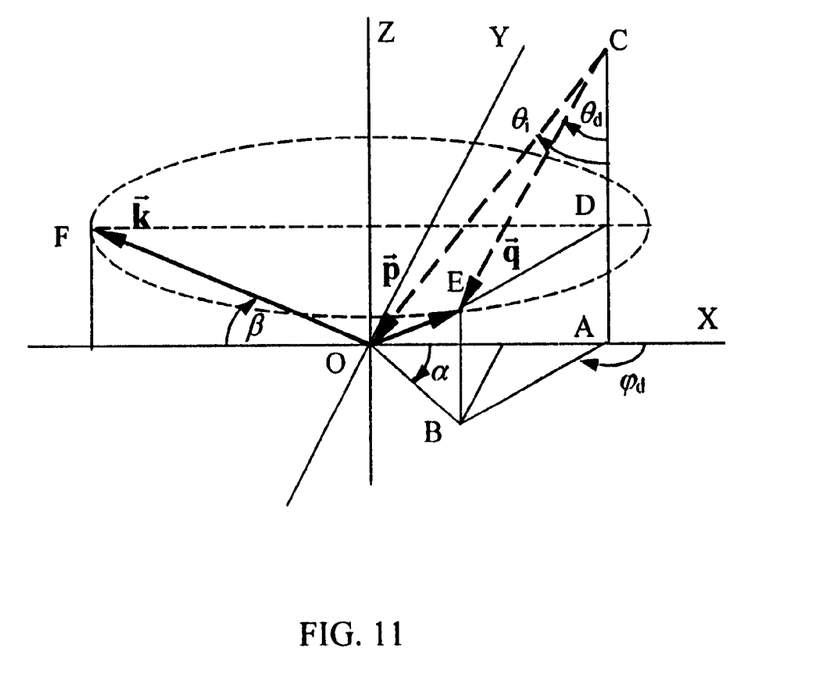
FIG. 11 provides for the calculation of the angle of grating rotation to satisfy with Bragg condition.

Reference should now be made to FIG. 11, which facilitates a calculation of the angle of grating rotation in its own plane $\alpha$ to satisfy with Bragg condition for beam propagating under angle $\theta_i$ to the plane of sample in the medium with refractive index n, and the angles of elevation $\theta_d$ and of azimuth $\phi_d$ of diffracted beam. When the vector of grating has an angle $\beta$ to the plane of sample then a Bragg condition is realized as is shown in FIG. 11, then the following equations obtain:

$$AB^2 = AO^2 + OB^2 - 2AO \cdot OB \cdot \cos\alpha \quad (15)$$

$$AB^2 = DE^2 = CE^2 - CD^2 =$$
$$CE^2 - (AC - AD)^2 = CE^2 - (CO \cdot \cos\theta_i - OF \cdot \sin\beta)^2$$

$$AB^2 = \frac{(2\pi)^2 n^2}{\lambda^2} - \left(\frac{2\pi n}{\lambda}\cos\theta_i - \frac{2\pi}{\Lambda}\sin\beta\right)^2$$

$$AB^2 = \frac{(2\pi)^2 n^2}{\lambda^2} - \frac{(2\pi)^2 n^2}{\lambda^2}\left(\cos^2\theta_i - 2\frac{\lambda}{n\Lambda}\cos\theta_i \cdot \sin\beta + \frac{\lambda^2}{n^2\Lambda^2}\sin^2\beta\right)$$

$$AO = CO \cdot \sin\theta_i = \frac{2\pi n}{\lambda}\sin\theta_i$$

$$OB = OE \cdot \cos\beta = \frac{2\pi}{\Lambda}\cos\beta$$

$$1 - \cos^2\theta_i + 2\frac{\lambda}{n\Lambda}\cos\theta_i \cdot \sin\beta - \frac{\lambda^2}{n^2\Lambda^2}\sin^2\beta =$$
$$\sin^2\theta_i + \frac{\lambda^2}{n^2\Lambda^2}\cos^2\beta - 2\frac{\lambda}{n\Lambda}\sin\theta_i \cdot \cos\beta \cdot \cos\alpha$$

$$2\frac{\lambda}{n\Lambda}\sin\theta_i \cdot \cos\beta \cdot \cos\alpha = \frac{\lambda^2}{n^2\Lambda^2} - 2\frac{\lambda}{n\Lambda}\cos\theta_i \cdot \sin\beta$$

$$\cos\alpha = \frac{1}{2\sin\theta_i \cdot \cos\beta}\left[\frac{\lambda}{n\Lambda} - 2\cos\theta_i \cdot \sin\beta\right]$$

$$\tan(\pi - \phi_d) = \frac{BG}{AG} =$$

$$\frac{OE \cdot \cos\beta \cdot \sin\alpha}{OC \cdot \sin\theta_i - OE \cdot \cos\beta \cdot \cos\alpha} = \frac{\lambda}{n\Lambda} \cdot \frac{\cos\beta \cdot \sin\alpha}{\sin\theta_i - \frac{\lambda}{n\Lambda}\frac{\lambda}{n\Lambda}\cos\beta \cdot \cos\alpha}$$

$$\tan\phi_d = \frac{\lambda}{n\Lambda} \cdot \frac{\cos\beta \cdot \sin\alpha}{\frac{\lambda}{n\Lambda}\cdot\cos\beta \cdot \cos\alpha - \sin\theta_i} \quad (16)$$

$$\sin\phi_d = \frac{DE}{CE} = \frac{\lambda}{2\pi n} \cdot \frac{OE \cdot \cos\beta \cdot \sin\alpha}{\sin(\pi - \phi_d)} = \frac{\lambda}{n\Lambda} \cdot \frac{\cos\beta \cdot \sin\alpha}{\sin\phi_d} \quad (17)$$

From equations (15), (16), and (17) the angle of grating rotation, and the angles of elevation $\theta_d$ and of azimuth $\phi_d$ of the diffracted beam can be found.

Figure 12A:
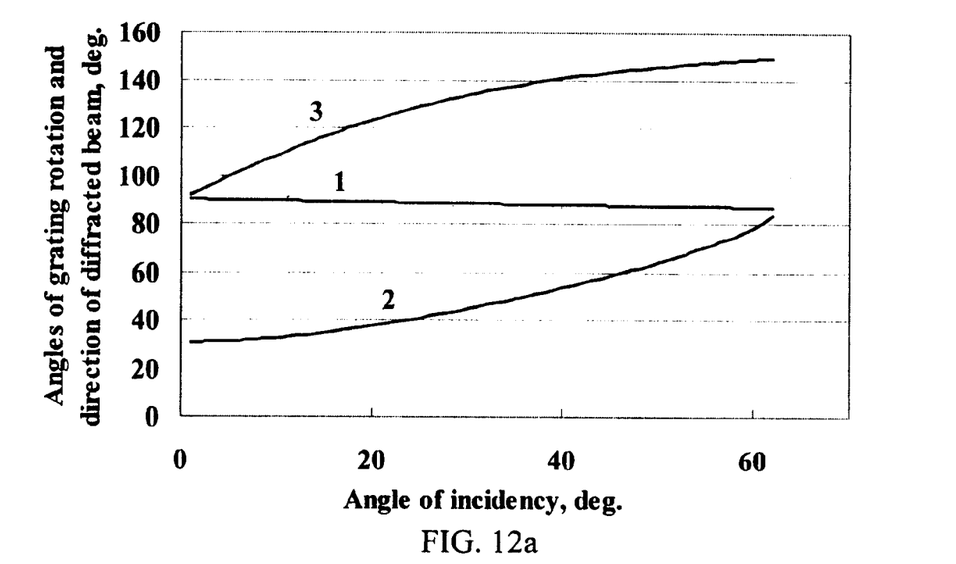
FIGS. 12a and 12b illustrate the dependence of the angle of grating rotation (1), and the angles of elevation (2) and azimuth (3) of diffracted beam vs. the angle of incidence of laser beam.

In FIG. 12a, there is an example of dependencies of all of said angles on the angle of incidence of laser radiation with wavelength of 1.55 μm. It was provided by a hologram recorded in photosensitive glass with refractive index of 1.49 and a Bragg grating vector having an angle of 10° to the plane of sample. The period of grating $\Lambda$ was calculated from equation (14) to do possible the implementation of Bragg condition for angles of incidence closed to the normal. The change of angles due to passing the beam through the surface of glass plate was taken into account. It is seen in FIG. 12a that just a little rotation of diffraction grating in its own plane will allow an alignment of grating to satisfy with Bragg condition and reach high diffraction efficiency.

Figure 12B:
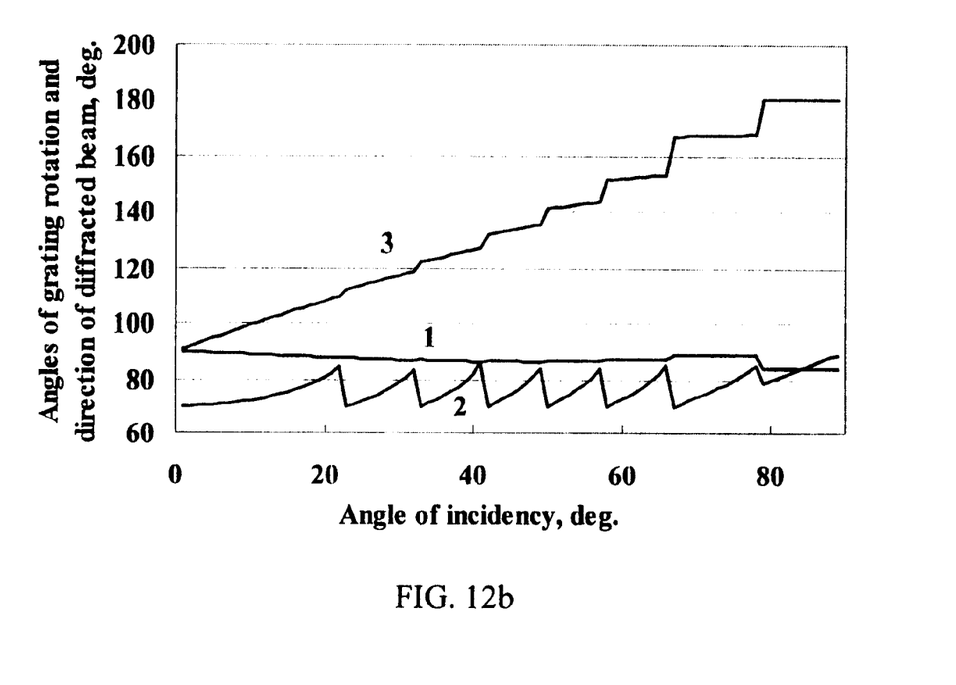

However, the angles of elevation $\theta_d$ obtained from equation (17) and of azimuth $\phi_d$ obtained from equation (16) of diffracted beam will change in rather wide diapason, i.e. it will be necessary to adjust both of these angles after grating rotation. This circumstance will not allow designing a planar customer unit because of wide diapason of elevation angle changing. However, it is possible to separate all diapason of incident angles in the several less diapasons and use proper grating in each specific case. It will not be difficult because just 6–9 types of grating will be enough to cover all diapason of incident angles. An example of such a decision is shown in FIG. 12b. In this example, the diapason of elevation angle changing will be from 70° to 85°, i.e. customer unit designed like one in FIG. 8, will have a thickness of about one third of grating diameter. Of course, it can be made thinner by optimization of grating parameters and customer unit design. Though the technical design of unit with volume grating is more complicated in comparison with using of plane grating, it has the advantage of connecting with an improved selection of signals under light illumination.

An increasing number of companies are currently interested in pursuing competing technologies for "last mile" communications which means that optical free-space systems are a cost effective alternative to fiber optic or microwave based communication technologies. This invention provides an optical communication means, which is clearly superior to known optical non-confined free-space transmission systems.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A communication system for transmitting intelligence from a transmitter site through non-confined free space and receiving said intelligence at a receiver site remote from and physically separate from said transmitter by non-confined free space, said transmitter and receiver sites comprising:
   a) a rotating diffraction grating; and,
   b) an independently rotating stage that includes:
      a laser source directing a beam onto the grating for transmission,
      a photodetector, and,
      a focusing system concentrating a received beam reflected from the grating onto the photodetector for reception;
   whereby selection of definite angles for signal transmission-reception is realized by corresponding rotation of said grating and said stage.

2. The system of claim 1 wherein the laser source includes: at least two laser sources each emitting identical wavelengths placed under different definite angles.

3. The system of claim 1 wherein the laser source includes: at least two laser sources each emitting different wavelengths placed under different definite angles.

4. The system of claim 1 wherein the laser source is a multiwavelength laser.

5. The system of claim 1 further comprising: at least two photodetectors installed around the grating.

6. The system of claim 1 wherein the rotating diffraction grating is a Bragg grating in a photosensitive material.

7. A communication system for transmitting intelligence from a transmitter site through non-confined free space and receiving said intelligence at a receiver site remote from and physically separate from said transmitter by non-confined free space, said transmitter comprising:

a) a rotating diffraction grating; and, b) an independently rotating stage with a mounted laser source directing a beam onto the grating for transmission, whereby selection of definite angles for signal transmission is realized by corresponding rotation of said grating and said stage.

8. The system of claim 7 wherein the independently rotating stage includes:

an optical laser beam expansion system for to improve divergence and direction of the beam onto said grating for transmission.

9. A communication system for transmitting intelligence from a transmitter site through non-confined free space and receiving said intelligence at a receiver site remote from and physically separate from said transmitter by non-confined free space, said transmitter comprising:

a) a rotating diffraction grating; and, b) an independently rotating stage that includes:
a photodetector, and,
a focusing system concentrating a received beam reflected from the grating onto the photodetector for reception, whereby selection of definite angles for signal reception is realized by corresponding rotation of said grating and said stage.

10. A method of transmitting optical signals through non-confined free space to any predetermined direction comprising the steps of:

a) rotating a diffraction grating; and, b) rotating an independently rotating stage with a mounted laser source directing a beam onto said grating, whereby selection of definite angles for signal transmission is realized by said rotating of the diffraction grating and the stage.

11. A method of receiving optical signals through non-confined free space from any predetermined direction comprising the steps of:

a) rotating a diffraction grating; and, b) rotating an independently rotating stage having
a photodetector, and
a focusing system concentrating a received beam reflected from the grating onto the photodetector for reception, whereby selection of definite angles for signal reception is realized by the rotating of the diffraction grating and the stage.

* * * * *